United States Patent [19]

Mackevich

[11] Patent Number: 4,890,050
[45] Date of Patent: Dec. 26, 1989

[54] AUTOMOTIVE ALTERNATOR

[75] Inventor: Daniel A. Mackevich, Chicago, Ill.

[73] Assignee: Vanguard Products Corporation, Hillside, Ill.

[21] Appl. No.: 105,095

[22] Filed: Oct. 6, 1987

[51] Int. Cl.⁴ .............................................. H02P 9/30
[52] U.S. Cl. .................... 322/34; 310/68 C; 310/68 D; 310/89; 310/184; 363/141
[58] Field of Search ............... 310/68 R, 68 C, 68 D, 310/71, 261, 254, 258, 259, 263, 89, 184, 58, 72, 62, 66, 63, 114; 290/1 B, 46, 52; 322/33, 34; 361/386, 388; 363/141

[56] References Cited

U.S. PATENT DOCUMENTS

| | | |
|---|---|---|
| 2,017,482 | 10/1935 | Vogel . |
| 2,102,538 | 12/1937 | Kinkaid . |
| 2,120,457 | 6/1938 | Beauchamp . |
| 2,473,485 | 6/1949 | Vickers . |
| 2,904,651 | 9/1959 | Williams . |
| 2,926,297 | 2/1960 | Humber et al. . |
| 3,062,989 | 11/1962 | Schultz et al. . |
| 3,131,322 | 4/1964 | Pleiss, Jr. et al. . |
| 3,236,183 | 4/1966 | Slonneger . |
| 3,351,790 | 11/1967 | Linkous . |
| 3,361,915 | 1/1968 | Baker .................... 310/68 R |
| 3,496,447 | 2/1970 | Thompson .................. 322/33 |
| 3,538,362 | 11/1970 | Cheetham et al. ........... 310/89 |
| 3,859,570 | 1/1975 | Veranth ................. 361/386 |
| 4,087,736 | 5/1978 | Mori .................... 310/263 |
| 4,342,068 | 7/1982 | Kling ................... 361/386 |
| 4,385,270 | 5/1983 | Balan et al. . |

FOREIGN PATENT DOCUMENTS

| | | | |
|---|---|---|---|
| 2847502 | 5/1980 | Fed. Rep. of Germany ...... 310/263 |
| 2400277 | 4/1979 | France ....................... 322/33 |
| 2030790 | 4/1980 | United Kingdom ........... 310/68 C |
| 2056789 | 3/1981 | United Kingdom ........... 310/263 |

Primary Examiner—R. Skudy
Attorney, Agent, or Firm—Wallenstein, Wagner, & Hattis, Ltd.

[57] ABSTRACT

An automotive alternator includes a thermal switch located in a rear chamber of the alternator enclosed by the housing rear wall and circumferential intermediate wall and the stator and rotor. The thermal switch is mounted on the heat-sinking collector tab of a power transistor in the regulator. In high power, low idling conditions with poor interior ventilation, the thermal switch senses heat produced from the rectifier diodes, rotor, stator and regulator to cut-off generation in over temperature conditions. Rings are furnished on the rectifier diode posts to conduct more heat from the diode body and the stator is potted with a special double dip and bake procedure with a thin viscosity two-part epoxy material.

3 Claims, 3 Drawing Sheets

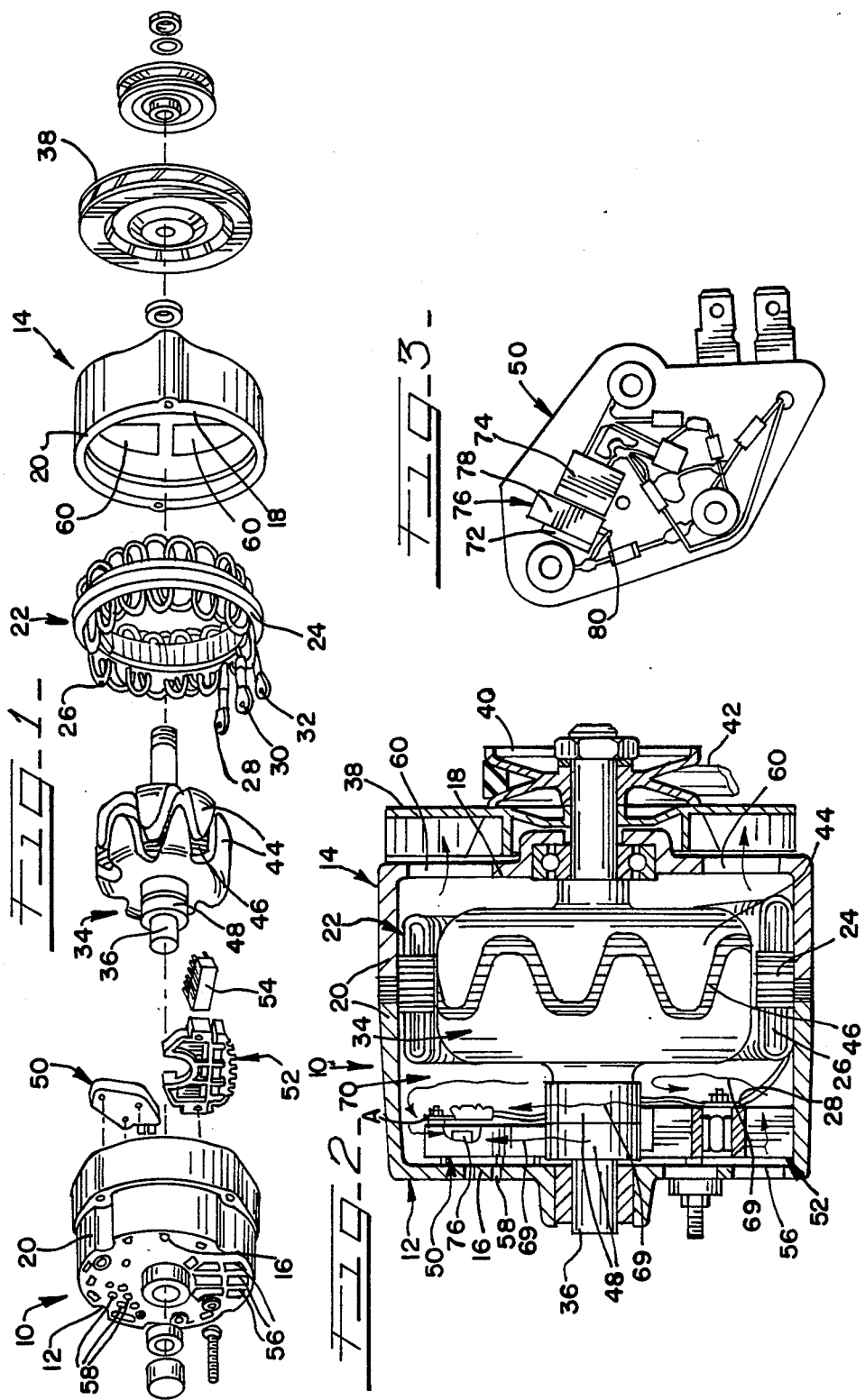

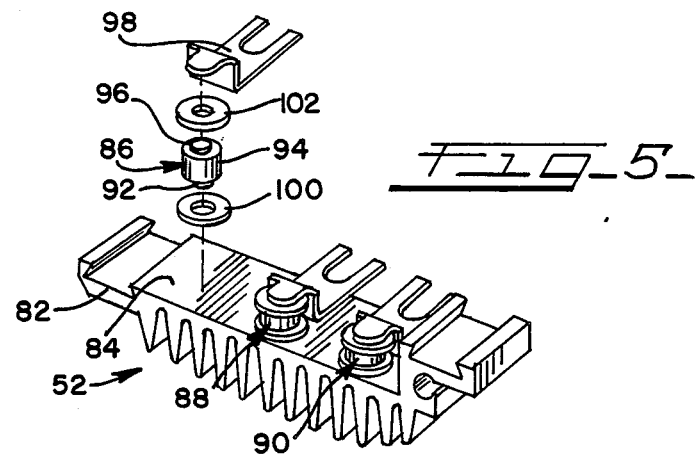
FIG_5_
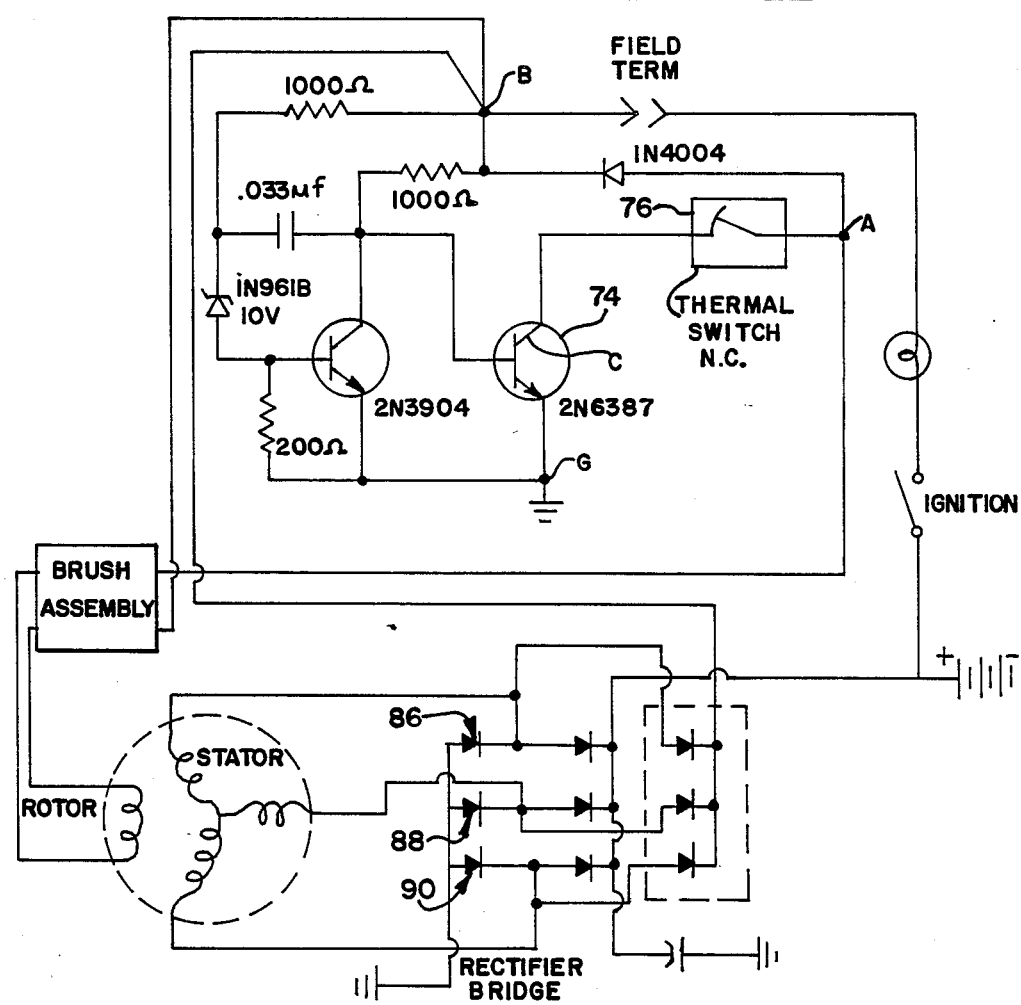
FIG_4_

AUTOMOTIVE ALTERNATOR

TECHNICAL FIELD

This invention relates generally to automotive alternators and particularly relates to automotive alternators that produce high electrical power at low revolutions.

BACKGROUND OF THE INVENTION

Automotive alternators are known to be mounted on gasoline or diesel engines in the engine compartment of the vehicle. The engine compartment has been and remains a hot environment. The heat from the radiator is carried into the engine compartment and baths the engine, alternator and components mounted in the engine compartment. Additionally, heat radiated or conducted from the engine block also baths the alternator and other components in the engine compartment.

While the vehicle is moving, ventilating air generally flows from the front of the vehicle, through the radiator, across the engine and down underneath the vehicle. When the vehicle is standing, however, the airflow becomes minimal through the engine compartment, and much of the heat rises to the upper portion of the engine compartment, in which the alternator typically is located.

The alternator does not depend on the fan pulling air through the radiator for its cooling, but upon its own fan for drawing ventilating air through it. The fan pulls air in through perforations in the rear wall of the alternator, across the regulator and diode assembly heat sinks, between the stator and rotor assemblies and out openings in the front wall of the alternator. The alternator fan thus works against the air being drawn through the radiator and into the engine compartment. In addition to the heat generated by the engine, the alternator also produces substantial quantities of localized heat in producing the 50 to 80 amperes of electrical current often demanded in automotive vehicles. Temperatures of components inside the alternator often can reach 450-500° F. in these circumstances. These temperatures often approach the specified limits of components, such as the rectifier diodes, and power transistor in the rectifier.

This hot environment, which gives rise to the invention, becomes accentuated when the vehicle is standing and the engine is idling. The fan on the alternator often is inefficient in pulling air through the alternator, especially at low speeds. Further, as any motorist knows, an idling engine in a standing vehicle is poorly cooled and often rapidly increases in temperature. This regularly results in the overheating of engines on a hot summer afternoon in stop-and-go city traffic. While this heat is hard on engines, it is harder on alternators. The poor ventilation provided by the alternator fan or impeller moving air from the rear to the front of the alternator must fight the engine ventilating air moving from the front to the rear of the engine compartment. As a result, the small amount of ventilating air entering the idling alternator tends to stagnate in the rear chamber of the alternator between the rear wall, the rotor and stator laminations and the circumferential wall of the alternator housing. With poor ventilation, heat produced by the alternator tends to collect in the rear chamber, and if the alternator does not have proper thermal protection, the temperature at the rectifier diode junctions can exceed their ratings and be destroyed. This heat also has deleterious effects on the components in the regulator.

While the components of the alternator can be made more rugged to withstand the high temperatures experienced in an automotive alternator when the vehicle is standing and the engine is idling, such undesirably increases the cost and size of the automotive alternator.

What is desired is an automotive alternator that can withstand such harsh temperatures for extended periods while producing high current output. Such an alternator should have little increased cost or size to achieve the desired qualities. Further, it would be advantageous if an automotive alternator could produce substantially increased current with substantially no increase in cost or size and no decrease in expected life.

SUMMARY OF THE INVENTION

In accordance with the invention, a substantially increased current generating automotive alternator provides a thermal switch uniquely located to sense the highest temperatures experienced by the alternator diode assembly and voltage regulator under conditions of high load and poor ventilation. The alternator also furnishes inexpensive parts selectively located to remove additional heat from the rectifier diodes. Further, the stator assembly, which produces and carries the electrical current generated by the alternator, is made by a special double-dip potting epoxy process to reduce the heat that it produces.

All this results in an automotive alternator capable of producing substantially increased electrical current of up to 140 amperes with retention of normal or extended life in the harsh environment of an automotive engine compartment. For example, in one configuration previously commercially available, an alternator was specified to produce 100 amperes. In the same housing and with the improvements of the invention, an alternator of the invention can generate 140 amperes with no decrease in life.

In the preferred embodiment, an automotive alternator includes a thermal switch located in the rear chamber of the alternator to sense the heat produced from the rectifier diode assembly, regulator and the stator assembly in a high power and low idle condition where ventilation through the alternator remains poor. The thermal switch specifically is located in the regulator on the heat sinking collector tab of a power transistor controlling the current flowing through the rotor winding. The thermal switch is connected in series with the collector of the power transistor and becomes open under excessively high temperature conditions to stop current flow through the rotor and the production of current in the stator.

The preferred embodiment of the invention also includes small copper washer-like rings soldered to the diode mounting surface of the finned heat sink. Each ring encompasses the terminal mounting post of a rectifier diode and substantially extends between the end surface of the cylindrical body of the rectifier diode and the heat sink. The rings substantially increase the cross-sectional area available for conducting heat from the diode body to the finned heat sink and actually increase the amount of heat removed from the body of the rectifier diode. Previously, only the mounting posts acted to conduct heat from the diode body. This arrangement of rings enables the rectifier diode to operate at a higher current and produce more heat while remaining at a particular temperature, or to remain at a low temperature at a lower current rectification. The invention also provides these rings encompassing the opposite post of the rectifier diode and extending between the opposite end of the cylindrical body and flat terminal piece soldered to the opposite posts.

This stator assembly in the preferred embodiment comprises the usual stacked, compressed and pegged laminations and three-phase windings of wire. The potting process of the invention dips the stacked stator assembly into a liquid epoxy material having a thin viscosity that in-completely fills the spaces or interstices between the laminations and between the laminations and wires. The dipped stator assembly is baked at 200° F. for 12 hours and cools in the oven for two hours. The baked assembly then again becomes dipped in the liquid epoxy material having a thin viscosity and is again baked at 200° F. for two hours and then at a temperature of 500° F. for two hours. The twice-baked assembly then cools in the oven for another two hours before removing.

This process obtains a stator assembly more completely and solidly potted than presently obtained by dipping in high viscosity epoxy better to fill the spaces and interstices between laminations and windings. Such a solid potting substantially reduces the breakdown of insulation and in the laminations the windings between phases. It greatly improves the rigidity of the assembly to resist vibration that causes friction and overheating of the windings.

BRIEF DESCRIPTION OF THE DRAWING

FIG. 1 is an exploded perspective view of the alternator assembly of the invention;

FIG. 2 is a side elevational view of the alternator assembly, partially in median section;

FIG. 3 is a plan view of the regulator of the invention;

FIG. 4 is a schematic diagram of the electrical circuit of the invention;

FIG. 5 is an exploded perspective view of a portion of the heat sink assembly of the invention.

DESCRIPTION OF THE PREFERRED EMBODIMENT

Figure 6:
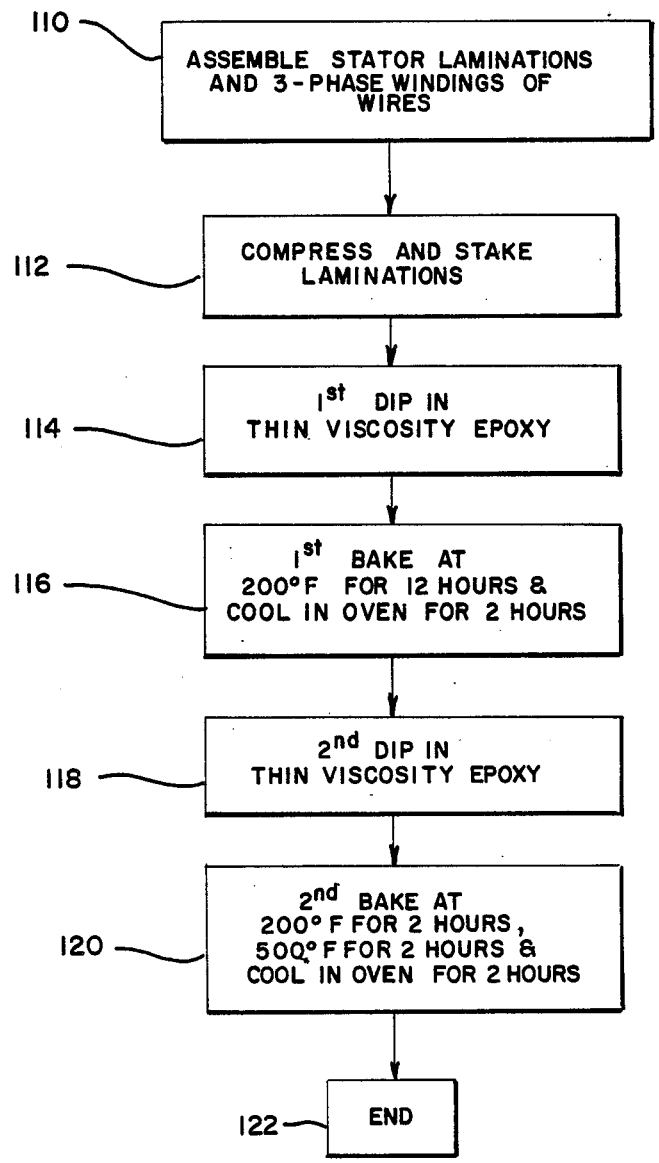
FIG. 6 is block diagram flow chart of a process of the invention.

Referring to FIGS. 1, 2 and 3, the alternator assembly 10 of the invention comprises a two-piece housing having a rear housing part 12 and a front housing part 14. Rear housing part 12 provides a rear wall 16 while the front housing part 14 provides a front wall 18. Together, the front and rear housing parts 14 and 12 furnish an intermediate wall 20 extending between the rear wall 16 and front wall 18.

The alternator assembly 10 also includes a ring-like stator assembly 22 comprised of a plurality of flat laminations 24 and three-phase windings of wires 26. The windings of wires 26 extend out to three terminals 28, 30 and 32.

A rotor assembly 34 comprises a shaft 36 extending through the alternator assembly 10 and out the rear and front walls 16, 18. In front of the front wall 18, shaft 36 carries fan or impeller 38 and a pulley 40. Pulley 40 engages with a drive belt 42 extending from the internal combustion engine (not shown) that rotates the shaft 36 through the belt 42. The impeller 38 serves to pull ventilating air through the alternator for cooling same. This will be discussed in detail presently. Rotor assembly 34 also includes pole pieces 44 and a winding of wires 46 internal of the laminations 24. The rotor windings 46 terminate at a pair of slip ring connectors 48.

Alternator assembly 10 also includes a regulator 50 mounted to the rear wall 16 and a finned heat sink assembly 52 also mounted to the rear wall 16. Heat sink assembly 52 includes a terminal block 54 that slips therein to provide terminal posts for interconnection with the other components in the alternator assembly 10.

Rear wall 16 provides plural perforations 56 aligned behind the heat sink assembly 52 and perforations 58 aligned with the regulator 50. Front wall 18 has substantial openings 60 therethrough evenly spaced around its area. The purpose of these perforations and openings 56, 58, 60 is to provide passage for ventilating air drawn by impeller 38 through the back wall 16, across the regulator 50 and heat sink assembly 52, across the rotor assembly 34 and the stator assembly 22 and out the openings 60 in the front wall 18.

In practice, this ventilation path works reasonably well when the shaft 36 rotates at a high speed. Impeller 38 at that time operates satisfactorily to draw sufficient air from the hot engine compartment in which the alternator assembly 10 is mounted through the alternator assembly 10 and out the front. Even though the engine fan pulling air through the radiator pushes air backwardly into the engine compartment and against the front of the impeller 38 and the front wall 18, this arrangement has worked satisfactorily. It has not worked well under all conditions, however.

When shaft 36 rotates slowly, such as when the engine is idling, impeller 38 operates poorly to draw ventilating air through the alternator assembly 10. In this condition, little if any ventilating air passes through the alternator assembly 10, and the heat generated at heat sink assembly 52 and regulator 50 becomes trapped (indicated by arrows 69) in a rear chamber 70 of the alternator assembly 10. This rear chamber 70 is formed by the rear wall 16, the intermediate wall 20, the stator assembly 22 and the rotor assembly 34. Especially at high electrical load, of such as between 100–140 amperes of current, the air temperature interior of the alternator assembly 10 in rear chamber 70 can approach 420° Farenheit. With poor ventilation from the inefficient operation of impeller 38, the air flow across the fins of heat sink assembly 52 remains turbulent and the heat moves laterally and upwardly across regulator 50 rather than outwardly through openings 56 and out of the alternator assembly 10.

The inventor herein has determined that the alternator assembly 10 of the invention safely can provide 140 amperes of electrical current with no degredation of life of the alternator assembly 10 by locating a protective thermal switch at a particular location in the alternator assembly 10. This particular location is selected best to sense temperature in the poor ventilation, conditions that occur when the alternator assembly 10 is idling to protect the alternator assembly 10 from over heating under heavy load conditions of 140 amperes.

This particular location has been determined to be in the regulator assembly 50 and on a collector heat sink tab 72 of a power transistor 74 regulating current applied to the rotor winding 46 for producing the 14 amperes of current in the stator windings 26. The invention thus provides a thermal switch 76 having a case electrically connected by such as soldering to the collector heat sink tab 72 of power transistor 74 and having an insulating terminal 80 connected in series to a terminal post A of the regulator 50.

Under high speed operation of the regulator 50, impeller 38 operates efficiently to draw air through perforations 56 in substantially laminar flow across the heat sink fins to remove large quantities of heat therefrom to maintain the rectifier diodes therein cool. Impeller 38 also operates efficiently to draw cooling air over the regulator 50 to maintain its temperature relatively cool so that the components therein do not overheat. In this well ventilated condition, thermal switch 76 operates well to sense the temperature on the collector heat sink tab 72 of the power transistor 74 to protect against over current and over temperature conditions.

In the low idle condition, the thermal switch 76 senses the excess heat, not only from the power transistor 74 but also from the heat sink assembly 52, the rotor assembly 34 and the stator assembly 22. This helps protect the alternator assembly from excessive temperature conditions and extends the life of the alternator assembly.

Another related problem in alternator assembly is the excessive heat build up at the junctions of the rectifier diodes included in heat sink assembly 52. Referring to FIG. 5, heat sink assembly 52 in part, comprises a lower finned member 82 having a flat diode mounting surface 84. Three rectifier diodes 86, 88 and 90 are mounted thereto by such as soldering a lower post 92 of diode 86 to the diode mounting surface 84. A top post 96 of diode 86 becomes soldered to a stamped terminal 98 for connection to the regulator 50.

A perhaps unrecognized problem with such an arrangement of mounting the diodes to the lower finned member 82 and the stamped terminals 98 only by their bottom and top posts has been inadequate heat removal from the diodes. The posts 92 and 96 have smaller cross-sectional diameters than the plastic body 94 and provide smaller cross-sectional areas through which heat, generated by the rectification of up to 50-80 amperes has been produced.

The invention herein provides increased heat removal so that the rectifier diodes can provide up to 140 amperes of current and remain below their rated junction temperature. The invention obtains this increased current capacity by furnishing thin copper rings or washers 100 and 102 mounted circumferentially, respectively, of the bottom post 92 and the top post 96. Ring 100 fits between the body 94 and the lower finned member 82, and ring 102 fits between the body 94 and the stamped terminal 98. These rings have a thickness of typically 0.025 inches to contact both the body and the finned member or the stamped terminal. These rings increase the cross-sectional are through which heat can flow from the rectifier body 94 to reduce the junction temperature therein.

Each diode 86, 88 and 90 has a pair of these rings circumferentially of its top and bottom posts. Most heat sink assemblies 52 provide two such combinations of heat sinks and diodes for a total of six rectifier diodes, each provided with the top and bottom rings.

In FIG. 4, the invention provides a substantially standard electrical circuit for operating the alternator assembly 10 of the invention with the thermal switch 76 connected between terminal post A and a collector C of power transistor 74. Power rectifier diodes 86, 88 and 90 are connected in series between the three-phase windings of wire of the stator and circuit ground.

The inventor herein has also determined that the heat produced in the stator assembly 22 can be reduced.

Referring to FIG. 6, process block 110 indicates that the stator assembly becomes assembled in a standard manner with thin, annealed laminations and the three-phase windings of wires. Process block 112 indicates that the laminations become compressed and staked to secure them firmly together. This compression and staking still leaves small spaces or interstices between the laminations due to the imperfect surface configurations of the laminations and increasing by large spaces between the laminations further away from the stakes.

In the preferred embodiment of the invention, the compressed and staked stator assembly is first dipped in liquid epoxy material having a thin viscosity that intentionally incompletely fills the interstices between the laminations and between that laminations and wires. Previously, stators for automotive alternators generally were dipped in fiberglass filled varnish. The two-part epoxy used in the process of the invention is obtained from Masterbond of Teaneck, NJ, as product number EP 35 CLU. The epoxy material includes 1% to 2% of a heat shedding ingredient such as alumina silica to improve heat dissipation. This epoxy is made to have a thin viscosity by warming it, as desired.

The once-dipped stator assembly then becomes baked at approximately 200° F. for 12 hours and is cooled in the baking oven by turning off the heat for two hours. Cooling at room temperature results in bubbles that form voids in the epoxy. Cooling in the oven eliminates or substantially eliminates the formation of these bubbles. The once-baked stator assembly then again is dipped a second time in the same liquid epoxy material having a thin viscosity. This second dipping substantially fills the interstices between that laminations and between the laminations and wires. The twice-dipped stator assembly then becomes baked a second time at 200° F. for two hours, then at 500° F. for two hours and is cooled for two hours in the baking oven by turning off the heat. The stator assembly 22 then is completed and ready for assembly in the alternator assembly 10.

This twice dipping and baking with a thin viscosity, liquid epoxy material better fills the spaces or interstices between the laminations and between the laminations and wires than a single dip and bake operation with a thin or thick viscosity liquid epoxy material or glass filled varnish material. Using a two-part epoxy patting material provides better resistance to heat degradation and higher tensile strength than varnish-based potting materials. The thin viscosity in the two-part epoxy material is obtained by warming or heating before dipping the stator assembly in it. The end result is less heat generated in the stator assembly so that the stator assembly better can produce 140 amperes of electrical current while having a normal life.

The invention may be practiced otherwise than as specifically described herein while remaining within the scope of the appended claims. For example, an electrical circuit different from that disclosed in FIG. 4 can be used while maintaining the thermal switch on the power transistor controlling current to the rotor winding. By maintaining the thermal switch on the power transistor that regulates current to the rotor winding and in the rear chamber 70 to sense the heat of diode heat sink, the stator and the rotor, the benefits of the superior temperature sensing obtain. Different rings can be used to withdraw additional heat from the rectifier diodes and variations in the baking time and temperature can be used to better to fill the interstices between the laminations and the stator assembly.

I claim:

1. A high wattage automotive alternative adapted to be mounted on an engine and in an engine compartment of an automotive vehicle, said alternator comprising:
   (A) a housing having a partially perforated rear wall, a front wall providing ventilation openings therethrough and an imperforate, circumferential, intermediate wall extending between the front and rear walls;
   (B) a stator assembly including stator windings and mounted in said housing;
   (C) a rotor assembly including a rotor winding and mounted in said housing concentrically of said stator assembly;
   (D) said stator and rotor assemblies, said rear wall and said intermediate wall substantially closing off a part of the inside of said housing to form a rear chamber in said housing; said stator and rotor assemblies producing heat that becomes trapped in said rear chamber;
   (E) a diode assembly including a heat sink and plural diodes mounted on said heat sink, said diodes being connected to said stator windings to rectify electrical power produced in said stator assembly to DC power; and
   (F) a regulator connected electrically to said diode assembly and said windings of said stator and rotor to regulate the current produced in said stator windings, said regulator including a power transistor for controlling the current being applied to said winding of said rotor to produce said current in said stator, said power transistor including a heat sink tab extending therefrom and said regulator further including a temperature sensor mounted on said heat sink tab, said regulator being mounted on said rear wall in aid rear chamber of said housing and said temperature sensor substantially being exposed to heat to which said diodes and power transistor are exposed to open a connection with said power transistor upon said temperature sensor sensing an over temperature condition.

2. The alternator of claim 1 in which said heat sink tab is electrically connected to the collector of said power transistor and said temperature sensor is connected in series with said collector of said power transistor.

3. A high wattage automotive alternator adapted to be mounted on an engine and in an engine compartment of an automotive vehicle, said alternator comprising:
   (G) a housing having a partially perforated rear wall, a front wall providing ventilation openings therethrough and an imperforate, circumferential, intermediate wall extending between the front and rear walls;
   (H) a stator assembly including stator windings and mounted in said housing intermediate said rear and front walls;
   (I) a rotor assembly including a rotor winding and mounted on said rotor in said housing concentrically of said stator assembly;
   (J) Said stator and rotor assemblies, said rear wall and said intermediate wall substantially closing off a pair of the inside of said housing to form a rear chamber in said housing, said stator and rotor assemblies producing heat that becomes trapped in said rear chamber;
   (K) a heat sink assembly including at least one heat sink having fins and a smooth diode mounting surface, plural diodes mounted on said heat sink, said diodes being connected to said stator winding to rectify the electrical power produced in said stator assembly to DC power, said heat sink being mounted to said rear wall in said rear chamber, said heat sink including fins arranged adjacent said perforations in said rear wall so that low velocity ventilating air pulled into said rear chamber from said engine compartment to cool said diode assembly incompletely flows over said fins and poorly removes heat therefrom; and
   (L) a regulator connected electrically to said diode assembly and said windings of said stator and rotor to regulate the current produced in said stator windings, said regulator including a power transistor for controlling the current being applied to said winding of said rotor to produce said current in said stator, said power transistor including a heat sink tab extending therefrom and said regulator further including a temperature sensor mounted on said heat sink tab, said regulator being mounted on said rear wall in said rear chamber of said housing and said temperature sensor substantially being exposed to heat to which said diodes and power transistor are exposed to open a connection with said power transistor upon said temperature sensor sensing an over temperature condition.

* * * * *